(12) United States Patent
Kasriel

(10) Patent No.: US 7,296,051 B1
(45) Date of Patent: Nov. 13, 2007

(54) PREDICTIVE PREDOWNLOAD OF TEMPLATES WITH DELTA ENCODING

(75) Inventor: Stephane Kasriel, San Francisco, CA (US)

(73) Assignee: Digital River, Inc., Eden Prairie, MN (US)

( * ) Notice: Subject to any disclaimer, the term of this patent is extended or adjusted under 35 U.S.C. 154(b) by 428 days.

(21) Appl. No.: 10/079,932

(22) Filed: Feb. 19, 2002

(51) Int. Cl.
*G06F 15/16* (2006.01)
*G06F 12/00* (2006.01)
*G06F 17/30* (2006.01)

(52) U.S. Cl. ............... 709/203; 709/217; 709/219; 709/246; 711/137; 711/213; 707/10

(58) Field of Classification Search ............ 709/203, 709/217, 219, 246; 711/137, 213; 707/10
See application file for complete search history.

(56) References Cited

U.S. PATENT DOCUMENTS

| | | | |
|---|---|---|---|
| 5,680,634 A | 10/1997 | Estes | |
| 5,727,129 A | 3/1998 | Barrett et al. | |
| 5,728,129 A | 3/1998 | Summers | |
| 5,774,160 A | 6/1998 | Brendel et al. | |
| 5,802,292 A * | 9/1998 | Mogul | 709/203 |
| 5,826,258 A | 10/1998 | Gupta et al. | |
| 5,845,088 A | 12/1998 | Lewis | |
| 5,859,971 A | 1/1999 | Bittinger et al. | |
| 5,878,223 A * | 3/1999 | Becker et al. | 709/223 |
| 5,878,429 A | 3/1999 | Morris et al. | |
| 5,931,904 A | 8/1999 | Banga et al. | |
| 5,944,790 A | 8/1999 | Levy | |
| 5,978,841 A | 11/1999 | Berger | |
| 5,983,227 A | 11/1999 | Nazem et al. | |
| 5,987,480 A | 11/1999 | Donohue et al. | |

(Continued)

FOREIGN PATENT DOCUMENTS

DE 010146356 A1 4/2003

(Continued)

OTHER PUBLICATIONS

Mogul et al., HTTP Delta Clusters and Templates, Aug. 24, 2000, Network Working Group.*

(Continued)

*Primary Examiner*—David Wiley
*Assistant Examiner*—J. Bret Dennison
(74) *Attorney, Agent, or Firm*—North Oaks Patent Agency; Shawn B Dempster

(57) ABSTRACT

Techniques for predictive predownload of templates with delta caching are used to substantially minimize the time needed to send objects from a server to a client. A template builder generates templates for each web page. A prediction engine maintains a prediction map, responsive to web pages and other objects, the objects including the templates for web pages. The prediction engine selects objects likely to be requested by the client making the particular request, such as a next page or an object referenced by a page. A delta encoder for a page determines a delta between a current version of that page, and a template for that page, and encodes the page for delivery to the client using template information and delta information. The client is able to present the web page in response to the template information (which is likely already present at the client) and the delta information.

15 Claims, 2 Drawing Sheets

U.S. PATENT DOCUMENTS

| | | | |
|---|---|---|---|
| 6,003,087 A | 12/1999 | Housel, III et al. | |
| 6,021,426 A | 2/2000 | Douglis et al. | |
| 6,026,413 A | 2/2000 | Challenger et al. | |
| 6,067,565 A * | 5/2000 | Horvitz | 709/218 |
| 6,085,193 A * | 7/2000 | Malkin et al. | 707/10 |
| 6,098,152 A | 8/2000 | Mounes-Toussi | |
| 6,112,242 A | 8/2000 | Jois et al. | |
| 6,138,251 A | 10/2000 | Murphy et al. | |
| 6,144,990 A | 11/2000 | Brandt et al. | |
| 6,154,767 A * | 11/2000 | Altschuler et al. | 709/203 |
| 6,216,212 B1 | 4/2001 | Challenger et al. | |
| 6,256,712 B1 | 7/2001 | Challenger et al. | |
| 6,260,192 B1 | 7/2001 | Rosin et al. | |
| 6,263,352 B1 | 7/2001 | Cohen | |
| 6,314,485 B1 | 11/2001 | Paul | |
| 6,327,628 B1 | 12/2001 | Anuff et al. | |
| 6,343,318 B1 | 1/2002 | Hawkins et al. | |
| 6,374,305 B1 | 4/2002 | Gupta et al. | |
| 6,377,978 B1 | 4/2002 | Nguyen | |
| 6,397,217 B1 | 5/2002 | Melbin | |
| 6,405,252 B1 | 6/2002 | Gupta et al. | |
| 6,453,319 B1 | 9/2002 | Mattis | |
| 6,466,937 B1 | 10/2002 | Fascenda | |
| 6,553,413 B1 | 4/2003 | Leighton et al. | |
| 6,560,604 B1 | 5/2003 | Fascenda | |
| 6,606,525 B1 | 8/2003 | Muthuswamy et al. | |
| 6,623,529 B1 | 9/2003 | Lakritz | |
| 6,629,138 B1 | 9/2003 | Lambert et al. | |
| 6,697,844 B1 | 2/2004 | Chan et al. | |
| 6,704,024 B2 | 3/2004 | Robotham | |
| 6,721,780 B1 * | 4/2004 | Kasriel et al. | 709/203 |
| 6,728,785 B1 | 4/2004 | Jungck | |
| 6,760,746 B1 | 7/2004 | Schneider | |
| 6,826,626 B1 | 11/2004 | McManus | |
| 6,868,453 B1 | 3/2005 | Watanabe | |
| 6,873,877 B1 | 3/2005 | Tobias et al. | |
| 6,912,591 B2 | 6/2005 | Lash | |
| 6,944,817 B1 | 9/2005 | Danneels | |
| 6,981,017 B1 * | 12/2005 | Kasriel et al. | 709/203 |
| 7,058,700 B1 | 6/2006 | Casalaina | |
| 7,072,987 B2 | 7/2006 | Jurisch et al. | |
| 7,092,977 B2 | 8/2006 | Leung et al. | |
| 7,092,997 B1 | 8/2006 | Kasriel et al. | |
| 7,096,418 B1 | 8/2006 | Singhal et al. | |
| 2001/0037361 A1 | 11/2001 | Croy | |
| 2001/0037400 A1 | 11/2001 | Raz et al. | |
| 2001/0056460 A1 | 12/2001 | Sahota et al. | |
| 2002/0032677 A1 | 3/2002 | Morgenthaler et al. | |
| 2002/0048450 A1 | 4/2002 | Zetts | |
| 2002/0056010 A1 | 5/2002 | Lincoln et al. | |
| 2002/0062384 A1 * | 5/2002 | Tso | 709/229 |
| 2002/0138509 A1 | 9/2002 | Burrows et al. | |
| 2002/0138511 A1 | 9/2002 | Psounis et al. | |
| 2002/0161860 A1 | 10/2002 | Godlin et al. | |
| 2003/0009563 A1 | 1/2003 | Douglis et al. | |
| 2003/0110186 A1 | 6/2003 | Markowski et al. | |
| 2003/0110296 A1 | 6/2003 | Kirsch et al. | |
| 2003/0120752 A1 | 6/2003 | Corcoran | |
| 2004/0128346 A1 | 7/2004 | Melamed et al. | |
| 2006/0168118 A1 | 7/2006 | Godlin et al. | |
| 2006/0168348 A1 | 7/2006 | Casalaina | |

FOREIGN PATENT DOCUMENTS

| | | |
|---|---|---|
| EP | 001662405 A1 | 5/2006 |
| JP | 02003132086 A1 | 5/2003 |
| WO | WO00/28433 A2 | 5/2000 |
| WO | WO00/28433 A3 | 5/2000 |
| WO | WO02054258 A1 | 7/2002 |

OTHER PUBLICATIONS

Delphion Intellectual Property Network to search. "Welcome to the new world of IP Information, Delphion". 1997-2001 Delphion Inc.

Jeffrey Mogul, Fred Douglis, Daniel Hellerstein. "HTTP Delta Clusters and Templates", Aug. 24, 2000. Network Working Group. Internet-Draft.

Alberto Accomazzi. "RPROXY", Proxy: introduction. Copyright © 1999-2001 by Martin Pool unless otherwise noted.

U.S. Appl. No. 09/734,910, filed Dec. 11, 2000, Kasriel et al.

U.S. Appl. No. 09,827,268, filed Apr. 4, 2001, Kasriel et al.

U.S. Appl. No. 09/888,374, filed Jun. 22, 2001, Kasriel et al.

U.S. Appl. No. 09/923,292, filed Aug. 6, 2001, Kasriel et al.

U.S. Appl. No. 09/923,809, filed Aug. 7, 2001, Kasriel et al.

U.S. Appl. No. 10/058,232, filed Oct. 19, 2001, Kasriel et al.

Goulde, M., Network Caching Guide: Optimizing Web Content Delivery, Boston, MA, Patricia Seybold Group, Mar. 1999, pp. i-42.

Marshall Brian, How Stuff Works, "How Web Servers and the Internet Work," obtained at Internet address http://www.howstuffworks.com/web-server.htm, Jul. 14, 2005.

"Scalable Web Clusters with Static and Dynamic Contents" Casalicchio, E. Colajanni, M., IEEE International Proceedings on Conference Cluster Computing, pp. 170-177, Nov. 2000.

"Intelligent Prefetch in WWW Using Client Behavior Characterization" Swaminathan, N. Raghavan, S.V., International Symposium on Modeling, Analysis and Simulation of Computer and Telecommunication Systems, pp. 13-19, Sep. 2000.

"A Schema-Based Approach to Web Engineering" Kuhnke, C. Schneeberger, J. Turk, A., System Sciences, SCHEMA Electronic Documentation Solutions pp. 10, Jan. 2000.

A Survey of Web Caching Schemes For the Internet ACM SIGCOMM Computer Communication Review, pp. 36-46, Oct. 1999.

Client-Server Computing in Mobile Environment, Jin Jing. Abdelsalam Helal and Ahmed Elmagarmid, ACM Computing Surveys, vol. 31 No. 2, Jun. 1999.

"Active Cache: caching dynamic contents on the Web", Pei Cao, Jin Zhang and Kevin Beach, The British Computer Society, The Institution of Electrical Engineers & IOP Publishing Ltd., 1999.

* cited by examiner

PREDICTIVE PREDOWNLOAD OF TEMPLATES WITH DELTA ENCODING

RELATED APPLICATIONS

This application claims the benefit of U.S. patent application Ser. No. 09/734,910, filed 11 Dec. 2000, entitled "Predictive Pre-download Using Normalized Network Object Identifiers."

This application is related to U.S. patent application Ser. No. 10/058,232, filed 19 Oct. 2001, entitled "Differential Caching with Many-to-One and One-to-Many Mapping."

BACKGROUND OF THE INVENTION

1. Field of the Invention

The invention relates to delivering web pages and other objects from a server, using techniques such as predictive predownload and delta encoding.

2. Description of Related Art

When serving web pages and other objects from a web server, it is advantageous to substantially minimize the amount of time needed to send those objects from the server to the requesting client (also known as a browser).

One method includes attempting to maintain template information already known to the client, and to send only delta information from the server to the client. However, the template information must be determined and sent to the client after the client has requested a corresponding web page. This method suffers from the drawback that it does not substantially minimize the amount of time required to present the page to a client as because the template information, the delta information (or both) are not sent to the client as soon as possible.

Another method is to predownload web pages or other objects from the server to the client. This method includes selecting one or more next objects the client is likely to request, and sending those next objects from the server to the client in a predownload time before the client actually requests those next objects. However, this suffers from the drawback that if the selected next objects take a relatively long time to predownload, there is a substantial chance they might not be fully received before the client makes its next request.

BRIEF SUMMARY OF THE INVENTION

The invention includes a method and system which substantially minimizes the time needed to send and present objects from a server to a client, such as by using techniques for predictive predownload of templates with delta encoding. In one embodiment, a template builder generates a set of templates for each web page or other object. A prediction engine maintains a prediction map, responsive to web pages and other objects, the objects including the templates for web pages. The prediction engine selects one or more next objects likely to be requested by the client making the particular request, such as a next object or an object embedded in or referenced by a page. A delta encoder for a web page determines delta information in response to a current version of that page, and template information for that page, and encodes the web page for delivery to the client using the template information and delta information. The client is able to present the object in response to both the template information and delta information.

DETAILED DESCRIPTION OF THE INVENTION

Figure 1:
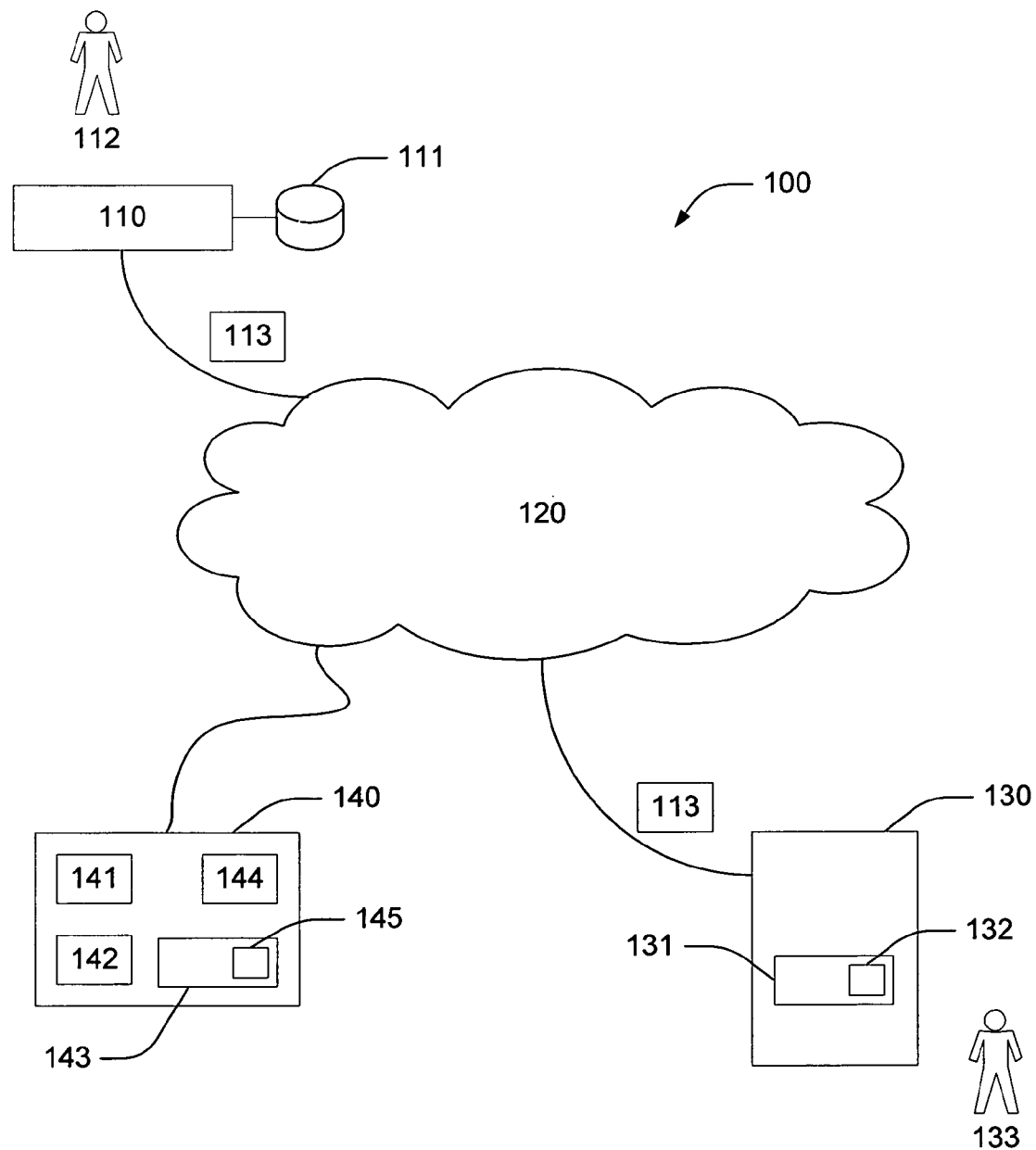
FIG. 1 shows a block diagram of a system including techniques involving predictive predownload of templates with delta caching.

The description herein includes a preferred embodiment of the invention, including preferred data structures and process steps. Those skilled in the art would realize after perusal of this application, that embodiments of the invention might be implemented using a variety of other techniques not necessarily specifically described herein, without undue experimentation or further invention, and that such other techniques would be within the concept, scope, and spirit of the invention.

Lexicography

The following terms relate or refer to aspects of the invention or its embodiments. The general meaning of each of these terms is intended to be illustrative and in no way limiting.

client and server—These terms refer to a relationship between two elements in a system (whether actual hardware devices, software elements, or some combination thereof), particularly to their relationship as client and server, not necessarily to any particular physical devices.

For example, but without limitation, a particular client (whether a hardware device or a software element) in a first relationship with a first server, can also be a server in a second relationship with a second client.

client device and server device—These terms refer to devices taking on the role of a client or a server in a client-server relationship (such as an HTTP web client and web server). There is no particular requirement that any client devices or server devices must be individual physical devices, or even that they must be hardware entities. They can each be a single device, a set of cooperating devices, a portion of a device, a single software element, a set of cooperating software elements, a portion of a software element, or some combination thereof.

web server—This refers to a server capable of providing web objects, including web pages and data elements embedded therein, to requesting clients.

delivery—in general, sending a web page from a web server to a web client.

delta information, delta encoding, encoding for delivery—as used herein, the term "delta information" refers to a selected portion of a web page that may vary between instances of the web page. Delta encoding and encoding for delivery refer to a process wherein a device determines template information and delta information, provides mapping functions between template URLS and server URLs, delivers information that will be subsequently integrated into a web page or other document for delivery to an end user and provides a transparent interface between a client device and a server.

object embedded in or referenced by a web page—in general, an object embedded in or referenced by a web page includes links to other information such as other web pages.

prediction engine, prediction map—in general, a prediction engine selects one or more objects likely to be requested by the client making the particular request, such as a next page or an object embedded in or referenced by a page. A prediction map, responsive to web pages and other objects is maintained by the prediction engine.

pre-download—in general, to download an object to a client device at a point in time before the object is requested by a client.

template information, template builder—in general, the term "template information" refers to a selected portion of a web page that is relatively unchanging. If there is no difference between different instances of a web page, then the entire page may composed of template information. A "template builder" refers to a technique for determining template information. De-coupling the service of template information from the service of delta information to a client increases the overall speed of serving the web page.

web objects—in general, web pages, data elements embedded in web page and elements of web pages such as template information and delta information.

The scope and spirit of the invention is not limited to any of these definitions, or to specific examples mentioned therein, but is intended to include the most general concepts embodied by these and other terms.

System Elements

FIG. 1 shows a block diagram of a system including techniques involving predictive predownload of templates with delta encoding.

A system 100 includes a set of clients 110, a communication network 120, a server 130, and a predownloader 140. Although the system 100 is described herein with regard to a single client 110 and a single server 130, those of ordinary skill in the art would understand, after perusal of this application, that the system 100 can also include multiple clients 110, multiple servers 130, or some combination thereof. Moreover, although the system 100 is described with regard to requests for web objects, such as using the HTTP protocol (hypertext transfer protocol) or a variant thereof, those of ordinary skill in the art would understand, after perusal of this application, that the system 100 can also or alternatively include other client/server relationships, and requests for other types of objects.

There is no particular requirement that clients 110 are all of the same type or servers 130 are all of the same type. For one example, some clients 110 might use Microsoft's "Internet Explorer" web browser, while other clients 110 might use the open source "Opera" web browser. For another example, some servers 130 might use the open source "Apache" web server, while other servers 130 might use another web server.

There is no particular requirement that objects being requested, or protocols used to request them, are all of the same type. For example, web objects might be requested using FTP (file transfer protocol), HTTP, or variants thereof. File objects might be requested using FTP, NFS (network file system), or variants thereof. Database objects might be requested using SQL (structured query language), CORBA (common object request broker architecture), or variants thereof.

Each web client 110 includes a processor, program and data memory, mass storage, input elements (such as a keyboard or a mouse or other pointing device) and output elements (such as a monitor or other display and a speaker), and a client cache 111, and is controlled by a user 112. The processor, program and data memory, and mass storage operate in conjunction to perform the functions of a web client 110 (also known as a web "browser"). The web client 110 generates outgoing messages 113 including requests for web objects, which it sends to the web server 130, and receives incoming messages 113 including responses to those requests, which can include data from web objects. In one embodiment, the web client 110 uses the HTTP protocol or a variant thereof, but as noted above, other protocols can also or alternatively be used. The client cache 111 includes a portion of the data memory or mass storage, and is capable of storing copies of data from web objects.

Each web client 110 is coupled to the communication network 120. In one embodiment, the communication network 120 includes at least a portion of an Internet, intranet, extranet, virtual private network, enterprise network, another form of communication network, or any other network, system, or technique capable of routing messages between and among one or more web clients 110 and web servers 130.

Each server 130 includes a processor, program and data memory, and mass storage. The data memory and mass storage are capable of storing objects 131, such as web pages, text, images, sounds, programs or program fragments, style-sheets, scripts, and other forms of data. Each object 131 can include one or more links 132 to other objects 131 (such as other web pages), and can also or alternatively include one or more embedded objects (such as embedded images, scripts, or other data). One or more of the servers 130 can also include input elements (such as a keyboard or a mouse or other pointing device) and output elements (such as a monitor or other display and a speaker), and be controlled by an operator 133.

The processor, program and data memory, and mass storage operate in conjunction to perform the functions of a server 130. In one embodiment, one or more of the servers 130 includes a plurality of devices each capable of acting as a server, cooperating using a load-sharing or other distribution technique for dividing the work of responding to requests among them, and jointly controlled by a single operator 133. Where multiple devices operate together, the server 130 can also be referred to as a "server farm".

The server 130 receives incoming messages 113 including requests for objects, and generates outgoing messages 113 including responses to those requests, which can include data from web objects. In one embodiment, the server 130 uses the HTTP protocol or a variant thereof, but as noted above other protocols can also or alternatively be used.

The predownloader 140 includes a delta encoder 141, a template builder 142, a predictor 143, a set of template information 144, and a set of prediction information 145. Although the predownloader 140 is described herein as a single device, those of ordinary skill in the art would recognize, after perusal of this application, that the predownloader 140 can be embodied as one or more devices, and including one or more elements such as the delta encoder 141, the template builder 142, and the predictor 143.

There is no particular requirement that the delta encoder 141, the template builder 142, and the predictor 143 are embodied in the same device or element. There can be a separate device or element for each of them or some of them. For example, in one embodiment, the delta encoder 141 and the predictor 143 can be embodied in a first device, while the template builder 142 is embodied in a second device.

There is no particular requirement that the delta encoder 141, the template builder 142, and the predictor 143 are each single devices or elements. There can be a multiple devices or elements, or some combination thereof, for each of them or some of them. For example, in one embodiment, there can be multiple delta encoders 141, multiple predictors 143, and one template builder 142.

There is no particular requirement that the template information 144 or the prediction information 145 are recorded in single databases. There can be a multiple copies of either or both of them, or there can be separate (and possibly different) copies of either or both of them, or some combination thereof. For example, in one embodiment, there can be multiple copies of the same template information 144 collectively used by different servers 130 (with similar data), while there is a separate set of prediction information 145 for each server 130.

From the server 130, the delta encoder 141 receives data for an object 131 to be delivered to a client 110. The delta encoder 141 determines if there is a stored template for the object 131 in the template information 144. The delta encoder 141 calculates delta information for the object 131, responsive to the object 131 and responsive to the template information 144. The delta encoder 141 generates a message 113 to the client 110 including the delta information and specifying the template it used. The client 110 is capable of presenting the object 131 in response to the message 113, by reconstructing the object 131 in response to the delta information and a template in the client cache 111. If the client cache 111 does not contain the template, the client 110 is capable of receiving that template from the server 130 and then reconstructing the object 131.

The delta encoder 141 calculates the size of the delta information it calculates for each object 131, and determines in response to that size, in response to a size for the object 131 itself, and in response to a threshold value (possibly set by the operator 133) whether the delta information is larger than it "should be." If so, the delta encoder 141 so informs the template builder 142 (using any available technique), thus allowing the template builder 142 to calculate a new template for the object 131. There is no particular requirement for the delta encoder 141 to use any particular technique for so informing the template builder 142; it can use a flag or other information in a database record (including for example marking the template "obsolete"), an interprocess message (including a remote procedure call in systems 100 where the delta encoder 141 and the template builder 142 are not executing on the same hardware device), a network message (such as a message 113 in the system 100), or any other technique capable of allowing the template builder 142 to understand the results of the calculation by the delta encoder 141.

The template builder 142 calculates templates for selected objects 131 and records one or more of those templates for each of the selected objects 131 in the template information 144. Thus, the template information 144 can include multiple templates for one selected object 131. For example, if object 131 has been changed more than once recently. Alternatively, template information 144 can include one template for a group of more than one selected object 131 when those objects 131 have similar information. In one embodiment, the template builder 142 marks each object with a calculated template with a pointer to that template or other indicator for that template.

In a first embodiment, the template builder 142 calculates templates in response to information from the delta encoder 141, indicating that the delta information for a selected object 131 is larger than it "should be." In a second embodiment, the template builder 142 calculates templates in response to changes in selected objects 131 as each such object 131 is changed at the server 130. In a third embodiment, the template builder 142 calculates templates for all selected objects 131 in a sweep across the entire set of such objects 131 maintained by the server 130. Selected objects 131 can include all objects 131 at the server 130, or a subset thereof, where the subset is determined in response to one or more of the following:

object age—Templates are calculated for objects 131 changed more recently than, or which are older than, a selected threshold (possibly set by the operator 133), or some combination thereof.

object size—Templates are calculated for objects 131 larger than, or smaller than, a selected threshold (possibly set by the operator 133), or some combination thereof.

object type—Templates are calculated for objects 131 having one of a first set of selected types, or not having one of a second set of selected types (possibly set by the operator 133), or some combination thereof. For just one example, templates might be calculated for all text objects, but for no sound objects.

operator selection—Templates are calculated for objects 131 selected by the operator 133, individually or in groups.

Those of ordinary skill in the art would recognize, after perusal of this application, that any one or more of these embodiments, or some combination thereof, might be used in the system 100.

The predictor 143 receives the identity of objects 131 requested by the client 110 (such as by receiving copies of the messages 113 requesting those objects 131). In one embodiment, each such message 113 includes a "referring page," indicating the object 131 just previously requested by the client 110. Using aggregates of this information, the predictor 143 constructs a directed graph of likelihood information, indicating for each object 131, what next objects 131 are most likely and what is their relative likelihood. The predictor 143 can also or alternatively operate by predicting next objects 131 in response to any links 132 present in each object 131, in response to aggregate information for which objects 131 are most likely to be requested independent of the referring page.

As noted above, if a client 110 receives delta information but does not have corresponding template information, that client 110 can request the associated template from the server 130. The associated template includes a script that can be executed by the client 110, and therefore can be treated by the predictor 143 like any other next object 131. In systems 100 where the associated template does not include a script (such as where delta encoding is performed using an extension or modification of the HTTP protocol), templates for each object 131 are still treated as next objects 131 that can be next requested by clients 110, and whose likelihood of being requested is calculated by the predictor 143.

In response to the predictor 143, the client 110 and the server 130 cooperate to pre-download (for example, to download to the client 110 and store in the client cache 111 before the user 112 specifically requests that object 131) the template for the object 131. In a first embodiment, the predictor 143 embeds a "hint" in the response message 113 to the client 110, suggesting a next object 131 to request if there is any idle time before the user specifically requests an object 131. In a second embodiment, the server 130 can generate a message 113 delivering the predicted next object 131, independently of an explicit request, which the client 110 stores in the client cache 111. Those of ordinary skill in the art, after perusal of this application, would recognize that the client 110 and the server 130 can operate in many different ways to pre-download the predicted next object 131 to the client 110 and store it in the client cache 111, and that all such techniques are within the scope and spirit of the invention.

In some embodiments, the client 110 and the server 130 can cooperate to deliver a compressed version of the delta information, the template information, or both, from the server 130 to the client 110. Delivering a compressed version of an object 131 can include either an extension or modification of the HTTP protocol, or can include other techniques. The system 100 can flexibly perform compression, including compressing only the delta information, only the template information, or compressing each separately.

Method of Operation

Figure 2:
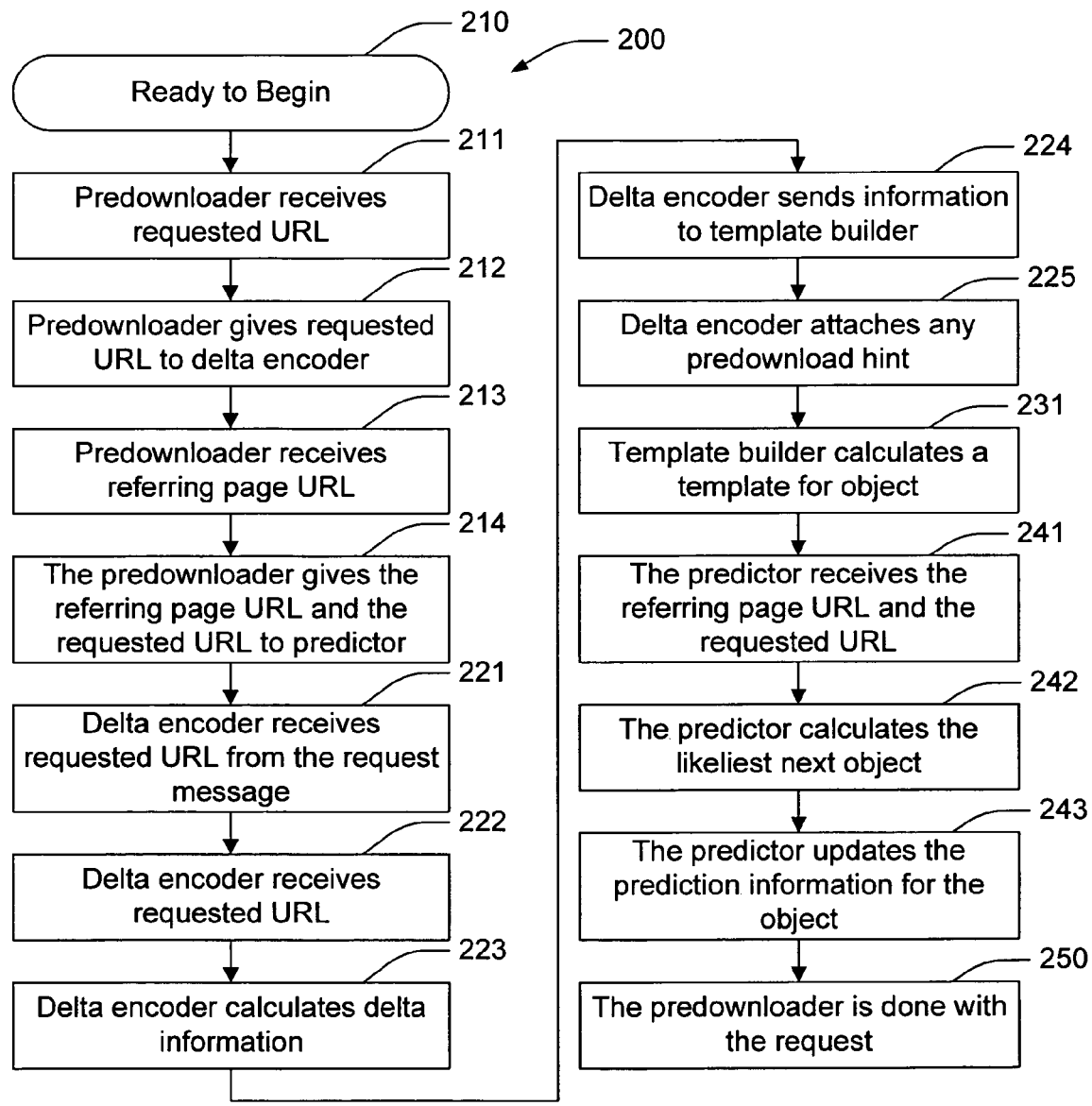
FIG. 2 shows a process flow diagram of a method of operation of a system including techniques involving predictive predownload of templates with delta caching.

FIG. 2 shows a process flow diagram of a method of operation of a system including techniques involving predictive predownload of templates with delta caching.

A method 200 is performed by the system 100. Although the method 200 is described serially, the steps of the method 200 can be performed by separate elements in conjunction or in parallel, whether asynchronously, in a pipelined manner, or otherwise. There is no particular requirement that the method 200 be performed in the same order in which this description lists the steps, except where so indicated.

At a flow point 210, predownloader 140 is ready to receive a request for an object 131.

At a step 211, the predownloader 140 receives a request message 113 from a client 110 for an object 131 from the server 130. The request message 113 includes a requested URL.

At a step 212, the predownloader 140 provides the requested URL to the delta encoder 141.

At a step 213, the predownloader 140 receives a referring-page URL, included in the request message 113.

At a step 214, the predownloader 140 provides the referring-page URL and the requested URL to the predictor 143.

At a step 221, the delta encoder 141 receives the requested URL included in the request message 113 from the predownloader 140.

At a step 222, the delta encoder 141 searches template information 144 and determines if there is a template for the object 131.

At a step 223, the delta encoder 141 calculates delta information for the object 131.

At a step 224, the delta encoder 141 determines whether the delta information for the object 131 is too large. In the event that the delta information for object 131 is too large, the delta encoder 141 informs the template builder 142 that the delta information for the object 131 is too large and a new template is generated.

At a step 225, the delta encoder 141 attaches any predownload hint information for the object 131 from the prediction information 145.

At a step 231, the template builder 142 calculates a template for the object 131 (if needed), and records that template in the template information 144.

At a step 241, the predictor 143 receives the referring-page URL and the requested URL from the predownloader 140. The referring-page URL and the requested URL are included in the message 113.

At a step 242, the predictor 143 calculates, in response to the referring-page URL and the requested URL, the likeliest next objects 131 for the object 131. The likeliest next objects include those objects associated with the object 131 that the user 112 is likely to request.

At a step 243, the predictor 143 updates the prediction information for the object 131, including predownload hint information for the object 131.

At a flow point 250, the predownloader 140 is done with the request. The method 200 continues at the flow point 210, where it is ready to receive another request.

ALTERNATIVE EMBODIMENTS

Although preferred embodiments are disclosed herein, many variations are possible that remain within the concept, scope, and spirit of the invention. These variations would become clear to those skilled in the art after perusal of this application.

Those skilled in the art would realize that any alternative embodiments described herein are illustrative, and in no way limiting.

The invention claimed is:

1. A method of predictive predownloading of next objects with delta encoding, including steps of:
    receiving from a client a request for an object;
    updating a prediction map in response to the request and a referring page that indicates an object just previously requested by the client, the prediction map associating the requested object with next objects likely to be requested;
    maintaining a stored set of templates for the requested object, each template comprising a selected portion of the requested object that is unchanging between instances of the requested object;
    calculating delta information for one particular template of the stored set of templates, delta information comprising selected portions of the requested object that vary between instances of the requested object; and
    sending to the client (i) a hint that includes a suggestion to download a next object based on the prediction map embedded in a response message with (ii) delta information for the requested object that specifies the particular template.

2. The method of claim 1 wherein the requested object comprises a web page.

3. The method of claim 1 wherein the hint comprises information to be stored in a client cache.

4. The method of claim 1 wherein the sending step comprises sending to the client the next object.

5. The method of claim 1 wherein the maintaining step comprises conditionally building a new template when the delta information exceeds a selected threshold.

6. The method of claim 1 wherein the maintaining step comprises determining a number of changes made to a set of selected objects and conditionally building a new template when the number of changes exceeds a selected threshold.

7. The method of claim 6 wherein the selected threshold includes a reference to one or more of the following: object age, object size, object type and operator selection.

8. An apparatus for predictive predownloading of templates with delta encoding, including:
    a delta encoder configured to calculate delta information for a requested web page responsive to a stored set of templates, each template comprising a selected portion of the requested web page that is unchanging between instances of the requested web page, delta information comprising selected portions of the requested web page that vary between instances of the requested web page;
    a template builder configured to build a new template for the requested web page if the delta information for the requested web page exceeds a threshold value; and a predictor configured to determine a set of next web pages likely to be requested in response to the requested web page and a referring page that indicates a web page just previously requested, the predictor also interacts with the template builder to build a template for at least one of the set of next web pages.

9. The apparatus of claim 8 wherein the threshold value includes a reference to one or more of the following: object age, object size, object type and operator selection.

10. The apparatus of claim 8 wherein the template builder builds the at least one template of the set of next web pages.

11. The apparatus of claim 8 wherein the predictor generates a hint that hint includes suggestions to a client what next object to download.

12. The apparatus of claim 11 wherein the hint includes URLS of templates for likely next pages.

13. The apparatus of claim 11 wherein the hint includes information to be stored in a client cache.

14. The apparatus of claim 11 further including a message generator configured to send to a client (i) the hint and (ii) delta information for the requested web page.

15. The apparatus of claim 14 wherein the message generator is configured to send to a client the next object identified by the hint.

\* \* \* \* \*